United States Patent Office.

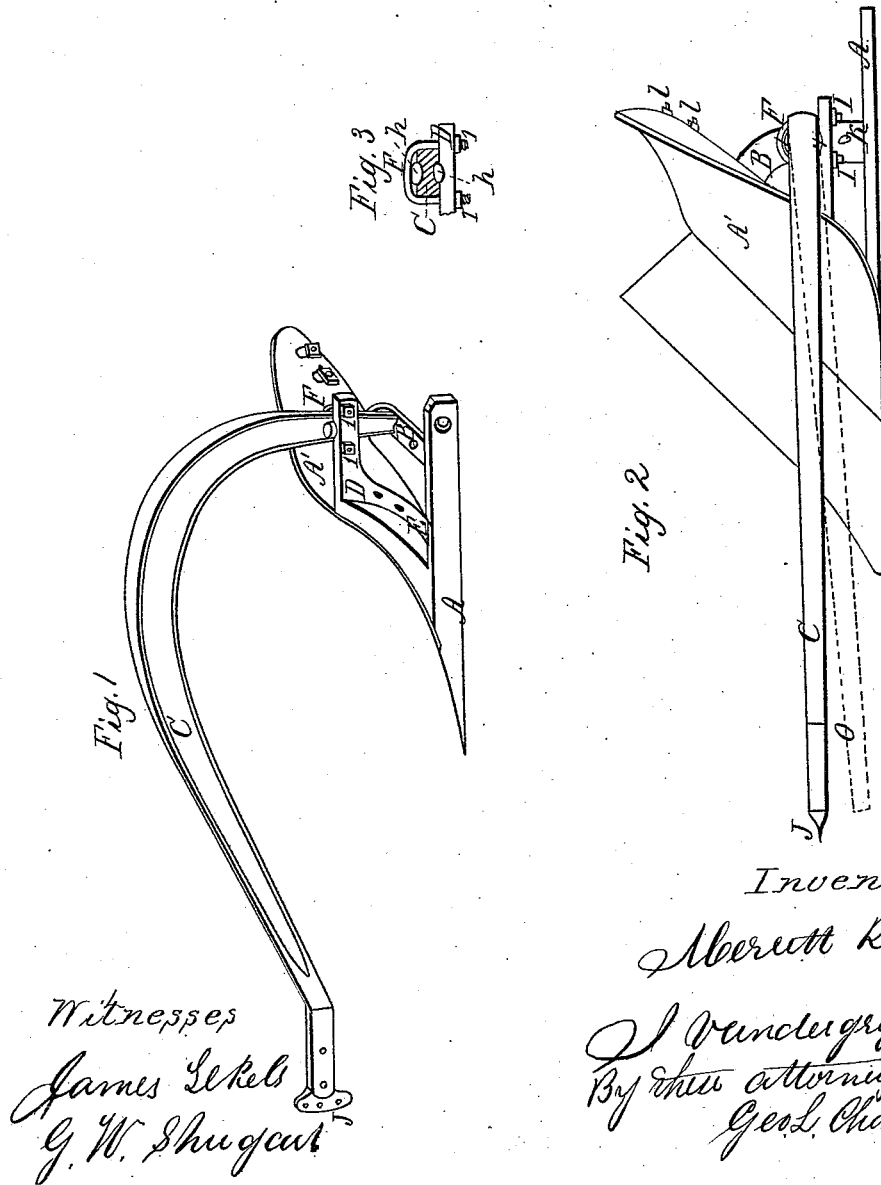

MERRITT RICHARDS AND JAMES VANDEGRIFT, OF PRINCETON, ILLINOIS.

Letters Patent No. 61,762, dated February 5, 1867.

IMPROVEMENT IN PLOUGHS.

The Schedule referred to in these Letters Patent and making part of the same.

TO ALL WHOM IT MAY CONCERN:

Be it known that we, MERRITT RICHARDS and JAMES VANDEGRIFT, of Princeton, in the county of Bureau, and State of Illinois, have invented a new and useful Improvement in Ploughs; and we do hereby declare that the following is a full, clear, and exact description of the construction and operation of the same, reference being had to the annexed drawings, and letters of reference marked thereon, making a part of this specification, in which—

Figure 1 is a perspective representation of our improved plough.

Figure 2 is a plan view of the same.

Figure 3 is a section of the beam, and also a section of the arm which supports the same, and the devices which hold the beam after it has been turned, so as to run the plough to cut a furrow of the desired width.

The nature of our invention consists, first, in making a double-concave wrought-iron beam, for which we claim the advantage of lightness and strength, not now secured by the use of any style of beam, whether wrought or cast; second, in making a foot-support for staying the land-side and mould-board, and providing a permanent pivot-seat for the rear end of the beam to rest upon; third, in providing an arm, extending out from the mould-board, for the purpose of furnishing an additional support for the beam, and clamping it firmly in position after it has been set to gauge the plough to cut the desired width of furrow; fourth, in the use of suitable filling or plugs fitted to the concave sides of the plough-beam, in order that the required pressure may be had against the sides of the beam, in order to hold it in a fixed position when once set.

The advantage to be gained by the use of our invention is, first, a beam can be made of iron rolled the required shape, which will be much lighter than any now in use, and yet possess all of the strength required for the purpose desired; and the beam can be set so as to run the plough to cut a furrow of any required width with much less trouble than by means of the common clevis; and further, the land-side and mould-board being securely attached together, the strain on the plough is not so great as when constructed according to the present plans.

To enable others skilled in the art to construct and operate our plough, we will give the necessary description.

A and A' represent the land-side and mould-board of the common plough. B shows the foot-support or brace, which is used for the double purpose of supporting the lower end of the beam and strengthening the land-side and mould-board. This support is attached to the land-side A and mould-board A', by means of bolts or otherwise, in a substantial manner, and has a vertical hole near the middle, and in a convenient place for receiving the pivot made on the lower end of the rear part of the beam C. D is the arm supporting the beam C near the top of the mould-board A'. This arm has an elbow, which passes down and against the cutter edge of the mould-board, to which it is rigidly attached, as seen at E, fig. 1. F represents the clamp, which holds the beam C firmly against the arm D. It will be seen at fig. 3 that the beam C passes through the clamp F, and has the plugs $h$ fitted in both sides of the concave beam; these plugs are important in not only assisting to hold the beam in position, but allow it to be swung such a distance to or from the land as will regulate the width of furrow to be turned. In order to give a correct understanding of the benefit of this device, we will refer to the position of the beam at fig. 2. The beam in this figure is set to run the plough so as to cut a wide furrow; but the dotted lines $o$ show how the beam C may be moved toward the land-side A so as to cut a furrow of less width. In order to accomplish this the bolts I, securing the clamp F, must be loosened, so that the beam can be turned as far as desired, after which the nuts can be tightened securely, and the beam C will be properly set for the required gauge. In order to make the plough complete, one of the handles can be put through the hole $k$, and the other bolted fast at $ll$, on the mould-board A'. The power can be applied at the end of the beam C at J in the usual manner.

Having thus fully described our device, what we claim, and desire to secure by Letters Patent of the United States, is—

1. The combination of the beam C, support B, land-side A, and mould board A', as set forth.

2. The arm D, in combination with the beam C, plugs $h$, clamp F, and mould-board A, as described and set forth.

MERRITT RICHARDS,
J. VANDEGRIFT.

Witnesses:
JAMES S. ECKELS,
J. W. SHUGART.